US009910485B2

(12) United States Patent
Mergen (10) Patent No.: US 9,910,485 B2
(45) Date of Patent: Mar. 6, 2018

(54) PERFORMANCE OF SERVICES BASED ON POWER CONSUMPTION

(71) Applicant: Raytheon BBN Technologies, Corp., Cambridge, MA (US)

(72) Inventor: John-Francis Mergen, Baltimore, MD (US)

(73) Assignee: Raytheon BBN Technologies, Corp., Cambridge, MA (US)

(*) Notice: Subject to any disclaimer, the term of this patent is extended or adjusted under 35 U.S.C. 154(b) by 325 days.

(21) Appl. No.: 14/451,095

(22) Filed: Aug. 4, 2014

(65) Prior Publication Data

US 2016/0034024 A1 Feb. 4, 2016

(51) Int. Cl.
*G06F 1/32* (2006.01)
*G06F 1/26* (2006.01)
*G08B 21/04* (2006.01)

(52) U.S. Cl.
CPC ............ *G06F 1/3296* (2013.01); *G06F 1/266* (2013.01); *G06F 1/3209* (2013.01); *G08B 21/0423* (2013.01); *G08B 21/0484* (2013.01)

(58) Field of Classification Search
CPC ...... G06F 1/3296; G06F 1/266; G06F 1/3209; G08B 21/0423; G08B 21/0484
USPC ...................................................... 340/573.1
See application file for complete search history.

(56) References Cited

U.S. PATENT DOCUMENTS

| | | | | |
|---|---|---|---|---|
| 2005/0131736 A1* | 6/2005 | Nelson | .................. | G06Q 50/22 705/2 |
| 2010/0145164 A1* | 6/2010 | Howell | ................ | A61B 5/0002 600/301 |
| 2010/0280774 A1* | 11/2010 | Ewing | ...................... | H04Q 9/00 702/60 |
| 2011/0138198 A1* | 6/2011 | Boss | ........................ | H02J 3/14 713/310 |
| 2011/0190953 A1* | 8/2011 | Park | ....................... | G05B 15/02 700/291 |
| 2011/0202961 A1 | 8/2011 | Asano | | |
| 2012/0245753 A1* | 9/2012 | Forbes, Jr. | ............. | G06Q 10/00 700/295 |

(Continued)

FOREIGN PATENT DOCUMENTS

GB 2502062 11/2013

OTHER PUBLICATIONS

Adhikari; Honeywell's Lyric May Disturb Google's Nest; E-Commerce Times; Jun. 10, 2014; 5 pages; http://www.ecommercetimes.com/story/80569.html ; ETC News Network.

(Continued)

*Primary Examiner* — Kerri McNally
*Assistant Examiner* — Thang Tran (57) ABSTRACT

Technology for performing services based on power consumption is disclosed. A plurality of power consumption levels can be identified at a service area. The plurality of power consumption levels can be characterized into current power consumption behavior. The current power consumption behavior can be compared to at least one power consumption behavioral model, the power consumption behavioral model including historical power consumption behaviors for the service area. A service can be performed when the current power consumption behavior diverges from the power consumption behavioral model outside of a predefined threshold.

19 Claims, 7 Drawing Sheets

(56) References Cited

U.S. PATENT DOCUMENTS

| | | | | |
|---|---|---|---|---|
| 2012/0265586 | A1* | 10/2012 | Mammone | G06Q 50/06 705/14.1 |
| 2012/0290230 | A1* | 11/2012 | Berges Gonzalez ... | G01D 4/004 702/61 |
| 2013/0317662 | A1* | 11/2013 | Ahn | G06Q 30/00 700/296 |
| 2014/0118148 | A1 | 5/2014 | Edlund et al. | |
| 2014/0172758 | A1 | 6/2014 | Klinnert et al. | |
| 2015/0057825 | A1* | 2/2015 | Steele | H02J 4/00 700/297 |
| 2016/0171866 | A1* | 6/2016 | Dupasquier et al. | G08B 21/0423 340/573.1 |

OTHER PUBLICATIONS

Farner; IFTTT Now Works with Nest Thermostat and Nest Protect; Best Techie; http://www.besttechie.com/2014/07/01/ifttt-now-works-with-nest-thermostat-and-nest-protect/ ; Jul. 1, 2014; 2 pages; Best Techie Holdings, Inc.

Honeywell; Lyric Thermostat; Specifications; Jun. 4, 2014; 2 pages; Honeywell, Inc.

Honeywell; Thermostats; http://web.archive.org/web/20140530065253/http://yourhome.honeywell.com/home/Product . . . ; archived online May 30, 2014; 12 pages; Honeywell, Inc.

Intel: Intel Healthcare and Life Science Solutions Worldwide; http://webarchive.org http://www.intel.com/about/companyinfo/healthcare/products/index.htm redirected to http://webarchive.org/web/20140224222707/http://www.intel.com/content/www/us/en/healthcare-it/healthcare-overview.html ; Archived online Feb. 24, 2015; 5 pages; Intel.

Lovejoy; Review: Europe's answer to Nest, Tado the iPhone-controlled intelligent thermostat; 9 to 5 Mac; Nov. 25, 2013; 35 pages; http://9to5mac.com/2013/11/25/review-europes-answer-to-nest-tado-the-iphone-controlled-intelligent-thermostat/.

Nest Labs; Nest Labs Introduces World's First Learning Thermostat—Nest Learning Thermostat Programs Itself, Saves Energy; https://nest.com/press/nest-labs-introduces-worlds-firstlearning-thermostat/#documents ; Oct. 25, 2011; 3 pages; Nest.com.

Ochs; Honeywell's Lyric brings geofencing to smart thermostats; TechHive; http://www.techhive.com/article/2361404/honeywells-lyric-brings-geolocation-to-smart-thermostats.html ; Jun. 10, 2014; 4 pages; TechHive.com.

Paradiso; A wearable health care system based on knitted integrated sensors; IEEE Transactions on Information Technology in Biomedicine; Sep. 2005; pp. 337-344; vol. 9, Issue 3; IEEE.

Radio Thermostat; Operation Guide CT30; Apr. 19, 2010 updated Oct. 15, 2014; 16 pages; Radio Thermostat Company of America.

Radio Thermostat; Operation Guide CT80; Mar. 20, 2009 updated Jul. 9, 2013; 20 pages: Radio Thermostat Company of America.

Tado; Intelligent thermostats—the tado way; Press Release; Apr. 2, 2014; 2 pages; tado GmbH.

Tado; Tado the Heating App; Press Release; Sep. 5, 2013; 2 pages; tado GmbH, Munich, Germany.

Tado; Tado—your heating just got smart; Press Release; Nov. 14, 2012; 3 pages; tado GmbH, Munich, Germany.

PCT Application PCT/US2015/043650; filed Aug. 4, 2015; Raytheon BBN Technologies, Corp.; International Search Report dated Oct. 5, 2015.

* cited by examiner

FIG. 7 ical examples and do not
PERFORMANCE OF SERVICES BASED ON POWER CONSUMPTION

BACKGROUND

The popularity of in-home health monitoring for patients and elderly individuals has grown in recent years. Home-based health care can alleviate rising health care costs and support aging populations. For example, sensors can be positioned on an individual's body to continually measure a number of vital signs, such as heart rate, blood pressure, oxygen saturation, temperature, etc. This information can be sent to a medical professional, either periodically or in real-time, to verify that the individual's vital signs are within a healthy range. In other examples, the individual's home can be outfitted with sensors and/or video cameras that can monitor movement and noise levels within the home. Such monitoring can ensure that elderly individuals within the home are safe, healthy and secure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Technology is described for performing services based on power consumption. A power meter can measure a plurality of power consumption levels for a service area. The power consumption levels can include amperage levels and/or voltage levels at the service area. The power meter can measure the power consumption levels according to a predefined sample rate. A processing element can be coupled to the power meter or exist as a standalone entity. The processing element can receive the power consumption levels from the power meter. The processing element can characterize the power consumption levels as a current power consumption behavior. For example, the current power consumption behavior can indicate one or more consumer devices that are currently being used within the service area. In addition, the current power consumption behavior can indicate one or more consumer devices that are not currently being used within the service area. The processing element can compare the current power consumption behavior to at least one power consumption behavioral model, wherein the power consumption behavioral model includes historical power consumption behaviors for the service area. The processing element can perform a service (e.g., a health monitoring service) when the current power consumption behavior diverges from the power consumption behavioral models (i.e., the historical power consumption patterns) outside of a predefined threshold.

In one example, the processing element can locally process the power consumption information associated with the service area in order to mitigate privacy concerns, such as data theft and data loss. The processing element can be integrated with existing infrastructure (e.g., smart-meter power equipment or similar sensors). In addition, the processing element can adapt to changes in a service area environment without modifying or adding sensors to the existing infrastructure. The sensors could use either the infrastructure provided smart-meter power equipment or similar sensors provided by systems such as a TED (The Energy Detective). Additional sensors that are already in the environment can also be integrated. Examples are networked thermostats, Nests, network fire detectors, alarm systems (open doors, open windows), presence detectors (wireless mac address scanners) and other similar detectors.

Figure 1:
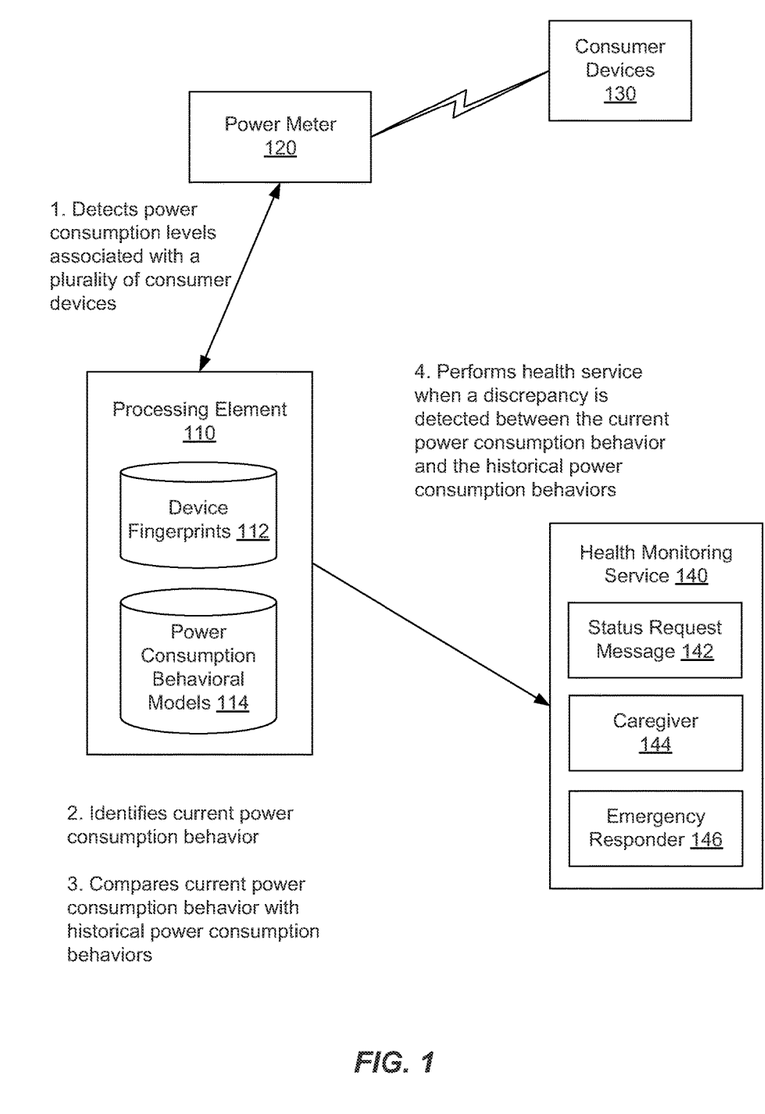
FIG. 1 illustrates a system and related operations for performing services based on power consumption in accordance with an example.

FIG. 1 illustrates a system and related operations for performing services based on power consumption. A power meter 120 (also known as a smart meter or a power line sensor) is an electronic device that can continuously monitor power consumption at a service area. The service area can include a home, an apartment, an office, etc. In one example, the service area can be defined as a portion of the home, apartment, etc. that is powered from a single service panel. The power meter 120 can measure a plurality of power consumption levels at the service area. In other words, the power meter 120 can measure in real-time a level of power consumption used by consumer devices 130 (e.g., computers, phones, refrigerators, ovens, water heaters, vacuum cleaners) within the service area. The power consumption levels can include amperage (or current) levels and voltage levels. In addition, the power meter 120 can measure a phase of the power consumed at the service area. The power meter 120 can measure the power consumption levels according to a predefined sample rate. For example, the power meter 120 can measure an amperage level, a voltage level and phase information at the service area on a per-second or other basis. As another example, the power meter 120 can measure the amperage level and voltage level at the service area at any time interval. In this manner, fine grained measurements can be made of the operation of various devices connected to the power main. The amperage levels and voltage levels at the service area can be graphically represented as a waveform, wherein the amperage levels and voltage levels can be illustrated over a period of time.

In one example, the power meter 120 can communicate power consumption information (e.g., current levels and voltage levels associated with the service area) in real-time to a central device, such as a processing element 110. The processing element 110 can be included in a home area network (HAN). The power meter 120 can communicate the power consumption information to the processing element 110 using power line communication, ZigBee, Institute of Electrical and Electronics Engineers (IEEE) 802.11 (also known as Wi-Fi), or other similar technologies. The processing element 110 can include a computer or any other system providing computing capability. As an example, the processing element 110 can be a single-board computer (SBC), i.e., a complete computer built on a single circuit board. Thus, the processing element 110 can include microprocessor(s), memory, input/output (I/O) and other features for providing a functional computer. The processing element 110 can be coupled to a display, so that a user associated with the service area can view the power consumption information. In one example, the processing element 110 can be integrated with the power meter 120. In another example, the power meter 120 can communicate the power consumption information associated with the service area to a remote server, such as a remote server operated by a utility company. The power meter 120 can communicate the power consumption information to the remote server using wired or wireless systems. Exemplary wireless systems can include Wi-Fi or wireless communication standards, such as Third Generation Partnership Project (3GPP) Long Term Evolution (LTE).

The processing element 110 can identify a plurality of power consumption levels at the service area. The processing element 110 can continuously or periodically receive power consumption information (e.g., current amperage levels and current voltage levels) from the power meter 120, and identify the power consumption levels using the power consumption information. As a non-limiting example, the processing element 110 can identify the power consumption levels for the service area on a per-second basis.

The processing element 110 can characterize the power consumption levels as a current power consumption behavior. The current power consumption behavior can indicate one or more devices that are currently being used within the service area. The current power consumption behavior can indicate an amount of power that a particular device is consuming in the service area. In addition, the current power consumption behavior can indicate one or more devices that are not currently being used within the service area. For example, the processing element 110 can use the power consumption levels (e.g., amperage levels and voltage levels) measured at the service area to detect that Device A is turned on. In other words, the processing element 110 can determine, based on a characterization of the power consumption levels, that the current power consumption behavior at the service area includes Device A being turned on. As another example, the processing element 110 can use the power consumption levels measured at the service area to detect that Device B is turned off. In other words, the processing element 110 can determine, based on the characterization of the power consumption levels, that the current power consumption behavior at the service area includes Device B being turned off.

In one configuration, the processing element 110 can identify power consumption behaviors at a specific time or over a period of time. For example, the processing element 110 can detect that Device A was turned on at 8:00 AM and turned off at 8:15 AM. As another example, the processing element 110 can detect that Device C consumed a higher average amount of power from 2 PM to 3 PM as compared to 8 AM to 2 PM. In another configuration, the processing element 110 can identify power consumption behavior at a given time. For example, the processing element 110 can detect that, at 8:15 AM, Devices A and D are turned on and Devices B, C and E are turned off. In other words, the current power consumption behavior for the given time can indicate which devices are turned on and which devices are turned off in the service area.

In one configuration, the processing element 110 can detect that a particular device is being used at the service area based on the plurality of power consumption levels, and in particular, based on an in-rush current when the device is turned on. The processing element 110 can detect the in-rush current to the device based on the plurality of power consumption levels. Each device can have a Thevenin equivalent and associated inductive/capacitive elements. Based on the voltage being supplied to the device and the in-rush current, a current lag and/or current lead can occur when the device is turned on. The current lag and/or current lead can be indicated on a characteristic waveform of the device starting up. In other words, the characteristic waveform can illustrate a unique start-up/shutdown sequence of the device. The processing element 110 can perform a Fourier transform on the characteristic waveform in order to obtain a fingerprint for the device. In other words, each device can be associated with a distinct fingerprint. The processing element 110 can distinguish between different fingerprints, and therefore, can distinguish Device A from Device B based on the plurality of power consumption levels measured at the service area.

In one example, the processing element 110 can store a plurality of device fingerprints 112 in a data store. The term "data store" may refer to any device or combination of devices capable of storing, accessing, organizing, and/or retrieving data. The storage system components of the data store may include storage systems such as a SAN (Storage Area Network), cloud storage network, volatile or non-volatile RAM, optical media, or hard-drive type media.

The plurality of device fingerprints 112 can include fingerprints associated with a plurality of consumer devices 130, such as televisions, refrigerators, microwaves, stereos, coffee makers, hair dryers, etc. When the processing element 110 detects a fingerprint associated with a certain device (e.g., Device A) from the power consumption levels measured at the service area, the processing element 110 may compare the detected fingerprint to the plurality of device fingerprints 112. If the processing element 110 detects a substantial match between the detected fingerprint and one of the plurality of device fingerprints 112, the processing element 110 can determine a type of device associated with the detected fingerprint.

As a non-limiting example, the processing element 110 can detect that Device A is a kitchen blender based on the fingerprint associated with Device A. In addition, the processing element 110 can distinguish Device A (e.g., the kitchen blender) from Device B (e.g., a coffee maker). Furthermore, the processing element 110 can detect that Device A (e.g., the kitchen blender) is turned on at 11:30 AM and Device B (e.g., a coffee maker) is turned on at 6:45 AM.

In one configuration, the processing element 110 can generate one or more power consumption behavioral models 114 for the service area. The processing element 110 can store the power consumption behavior models 114 in a data store. The processing element 110, via the power meter 120, can identify a plurality of power consumption levels at the service area over a defined time period. For example, the processing element 110 can measure power consumption levels (e.g., amperage levels and voltage levels) according to a predefined sample rate (e.g., on a per-second basis, a per minute basis, a number of days (e.g., 30 days), etc.). In addition, the processing element 110 can measure the power consumption levels over the defined time period, wherein the defined time period can be determined by a user in the service area.

The processing element 110 can identify power consumption patterns from the plurality of power consumption levels at the service area. The processing element 110 can use machine learning and/or pattern recognition techniques for identifying the power consumption patterns and refining the power consumption patterns over time. As an example, the processing element 110 can detect that Device A is generally used between 7 AM and 8 AM, Device B is generally used between 6 PM and 7 PM, and Device C is generally used between 9 PM and 9:30 PM. In another example, the processing element 110 can detect that a coffee maker is generally used between 7 AM and 8 AM, a kitchen range is generally used between 6 PM and 7 PM, and a lamp is generally used between 10 PM and 10:30 PM. In yet another example, the processing element 110 can detect that Devices A, B, C, D and E are generally not used between 9 AM and 12 PM on Sundays. In other words, events that repeatedly occur at the service area can be used to identify the power consumption patterns for the service area.

The power consumption behavioral models 114 can be generated based on the power consumption patterns. The power consumption behavioral models 114 can indicate patterns of use for one or more devices and/or patterns of non-use for one or more devices. In other words, the power consumption behavioral models 114 can include historical power consumption behaviors for the service area. In one configuration, the power consumption behavioral models 114 for the service area can be associated with a holiday, a vacation day, weekday, a weekend or a sick day. In other words, a first power consumption behavioral model 114 can be associated with a holiday, a second power consumption behavioral model 114 can be associated with a vacation day, a third power consumption behavioral model 114 can be associated with a weekday, a fourth power consumption behavioral model 114 can be associated with a weekend, and a fifth power consumption behavioral model 114 can be associated with a sick day. As an example, the power consumption behavioral model 114 for the weekday can include a pattern of turning on a water heater between 6 AM and 8 AM, whereas the power consumption behavioral model 114 for the weekend can include a pattern of turning on the water heater between 9 AM and 11 AM. In addition, the power consumption behavioral models 114 can be continuously updated using machine learning and/or user feedback based on current power consumption behavior at the service area.

The processing element 110 can compare the current power consumption behavior to the power consumption behavioral models 114. In other words, the processing element 110 can compare the current power consumption behavior to the historical power consumption behaviors for the service area. In one example, the processing element 110 can compare the current power consumption behavior and the power consumption behavioral models 114 using a match filter. The processing element 110 can determine whether the current power consumption behavior diverges from the power consumption behavioral models 114 outside of a predefined threshold or threshold range. Alternatively, the processing element 110 can determine whether the current power consumption behavior does not diverge from the power consumption behavioral models 114 outside of the predefined threshold. In other words, the processing element 110 can determine whether the current power consumption behavior deviates from the power consumption behavioral models 114 outside of an acceptable amount, or whether the current power consumption behavior corresponds with the power consumption behavioral models 114.

In one example, the predefined threshold can be defined by a user associated with the service area. The predefined threshold can be a number of minutes or an acceptable time range for which the current power consumption behavior is allowed to deviate from the power consumption behavioral models 114. For example, the power consumption behavioral model 114 can indicate that Device A (e.g., a toaster oven) is generally turned off by 9 AM on weekdays. Based on current power consumption levels, the processing element 110 can detect that Device A is turned off at 11:15 AM on a weekday (i.e., approximately 135 minutes later as compared to a typical weekday). In other words, the current power consumption behavior of Device A being turned off at 11:15 AM does not correspond to the power consumption behavioral model 114. If the predefined threshold is set to +/-30 minutes, then the processing element 110 can detect that the current power consumption behavior diverges from the power consumption behavioral models 114 outside of the predefined threshold.

In addition, the predefined threshold can depend on a type of current power consumption behavior. For example, the predefined threshold can be set to +/-60 minutes for the behavior of turning on a coffee maker, but +/-120 minutes for the behavior of turning on a tablet computer. If the coffee maker and the tablet computer are turned on 80 minutes and 160 minutes, respectively, after a typical start time, these behaviors are considered outside of the predetermined threshold.

As another example, the power consumption behavioral model 114 can indicate that Device B is generally turned on between 3 PM and 4 PM on Saturdays. Based on current power consumption levels, the processing element 110 can detect that Device B is turned on at 3:35 PM on Saturday. In other words, the current power consumption behavior of Device A being turned on corresponds to the power consumption behavioral model 114. Therefore, the current power consumption behavior does not vary from the power consumption behavioral models 114 outside of the predefined threshold.

In one example, the processing element 110 and the system in which it is contained can perform a service when the current power consumption behavior diverges from the power consumption behavioral model 114 outside of the predefined threshold. In one exemplary aspect, the service can include a health monitoring service 140. The health monitoring service 140 can include communicating a status request message 142 to a user associated with the service area when one or more of the current power consumption behaviors diverges from the power consumption behavioral models 114 outside of the predefined threshold. The status request message 142 can be in the form of an electronic message (e.g., email, text message) or phone call. The status request message 142 can ask the user to verify a health associated with the user. In one example, a response to the status request message 142 can be sufficient for verifying the user's health. Alternatively, the status request message 142 may include a set of questions for the user to answer and send back to the processing element 110.

If the response to the status request message 142 is received at the processing element 110 within a defined time window (e.g., 30 minutes), then the processing element 110 does not perform additional heath monitoring services. If the response to the status request message 142 indicates that the user's health is unsatisfactory, or no response to the status request message 142 is received at the processing element 110 within the defined time window, then the processing element 110 can perform one or more additional tasks or functions as part of the health monitoring service 140. For example, the health monitoring service 140 can include generating an alert to be sent to a caregiver 144 (or other emergency contacts, such as family or friends) or an emergency responder 146.

Since individuals generally adhere to consistent routines (e.g., wake up at a routine time, go to bed at a routine time, perform routine tasks, etc.), abnormalities in power usage at the service area can potentially indicate red flags relating to the individuals' health. Therefore, when an individual wakes up later than usual, eats at unusual times or does not eat regularly, sleeps at irregular times, etc., as evidenced by the individual's power usage, the health of the individual can be verified to ensure that the individual is safe and secure. If a potential health issue does arise, the appropriate care givers or medical professionals can be alerted.

In one example, the processing element 110 can perform the health monitoring service 140 when the current power consumption behavior at the service area does not correspond to the power consumption behavioral models 114. For example, if the power consumption behavioral models 114 indicate that the user generally uses Device A and Device B within the range of 7 AM to 8 AM and 10 AM to 12 PM, respectively, but does not use Device A or Device B on a given day where such usage typically occurs, the processing element 110 can generate the alert. As another example, the processing element 110 can generate the alert when N abnormalities occur during a Y-hour period, wherein N and Y are integers. For example, the power consumption behavioral models 114 can indicate that the user generally uses Device A from 7 AM to 8 AM, Device B from 11 AM to 1 PM and Device C from 6 PM to 7 PM. In addition, the predetermined threshold for each of these devices can be +/−60 minutes. If the user's use of Devices A, B and C is outside the predefined threshold as compared to the power consumption behavioral models 114, or the user does not use Devices A, B and C at all during the day, the processing element 110 can perform the various functions of the health monitoring service 140.

In one configuration, the processing element 110 can receive a response to the status request message 142 from the user, wherein the response indicates that the current power consumption behavior is acceptable to the user. The processing element 110 can update the power consumption behavioral model 114 to incorporate the current power consumption behavior. For example, the processing element 110 can send the status request message 142 to the user upon detecting that a coffee maker was not turned on between 8 AM and 9 AM, which diverges from the power consumption behavioral model 114 outside of the predefined threshold. Rather, the coffee maker was turned on at 10 AM. The user can respond to the processing element 110 indicating that turning on the coffee maker at 10 AM is an acceptable behavior, or can respond positively that such action was intentional, and that no additional assistance is needed. Therefore, the processing element 110 can update the power consumption behavioral model 114 to indicate that the coffee maker can be turned on between 8 AM and 10 AM, should the user desire to have the system updated and he/she indicates as much. In other words, the processing element 110 can use machine learning and user feedback to continuously improve the power consumption behavioral models 114.

In one configuration, the processing element 110 can provide a notification with positive reinforcement when the current power consumption behavior corresponds with the power consumption behavioral model 114. For example, the processing element 110 can send the notification upon detecting that Devices A, B, C and D were used at the service area in accordance with the power consumption behavioral model 114. As another example, the processing element 110 can send the notification upon detecting desirable habits (e.g., waking up at a regular time, preparing three meals), as evidenced by the power consumption behavior at the service area. In another configuration, the processing element 110 can provide a notification with suggested actions when the current power consumption behavior at the service area does not correspond with the power consumption behavioral model 114. For example, the processing element 110 can detect that Device A was turned on an hour late, Device B was not turned on, and Device C consumed greater power than average. Therefore, the processing element 110 can provide suggestions or recommendations so that current power consumption behaviors at the service area are aligned with the power consumption behavioral models 114. As another example, the processing element 110 can send the suggestions upon detecting undesirable habits (e.g., irregular sleep patterns), as evidenced by the power consumption behavior at the service area.

Figure 2:
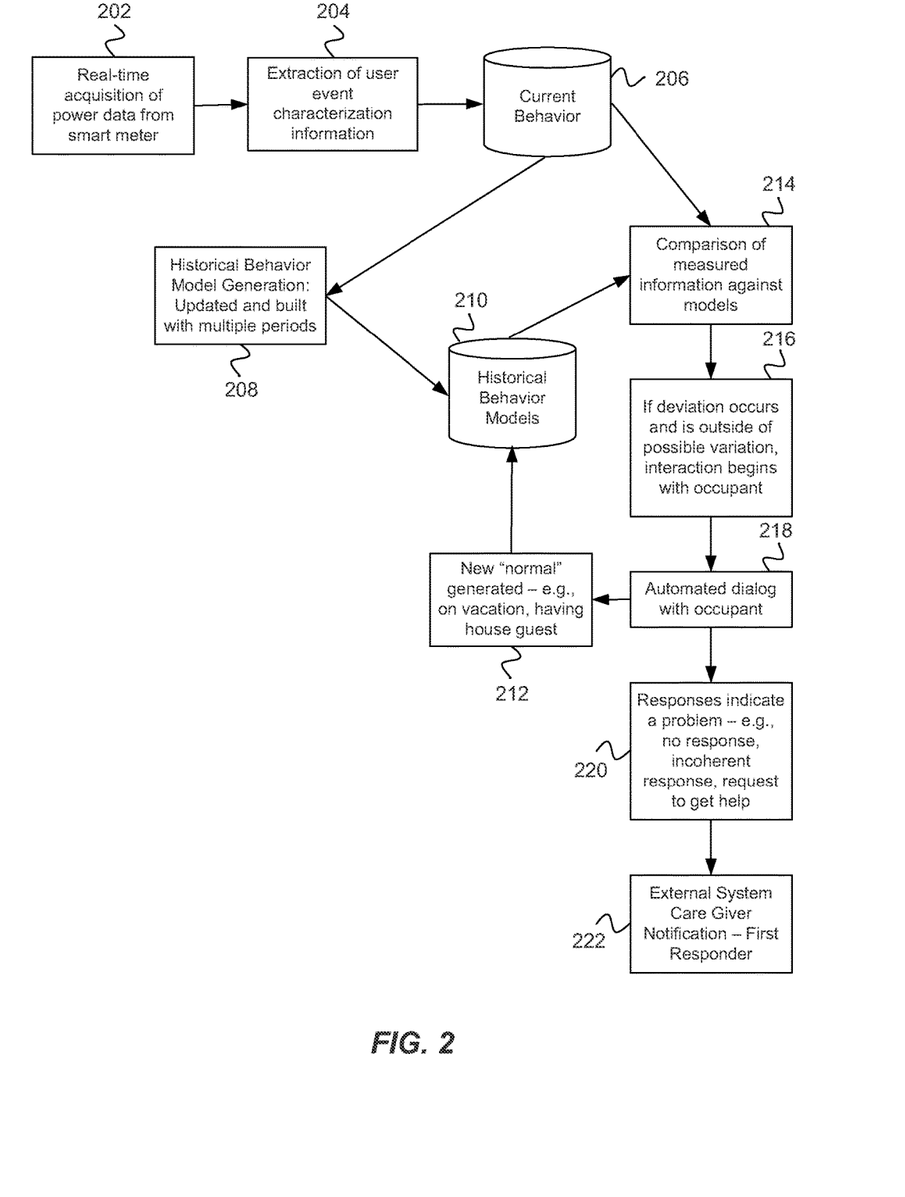
FIG. 2 is a flowchart for identifying current power consumption behavior at a service area and performing services based on the current power consumption behavior in relation to power consumption behavioral models in accordance with an example.

FIG. 2 is a flowchart for identifying current power consumption behavior at a service area and performing services based on the current power consumption behavior in relation to power consumption behavioral models. In step 202, real-time acquisition of power data can be performed using a smart meter. The power data can be associated with a service area, such as a home or apartment. The power data can include amperage levels, voltage levels and phase information. In step 204, user event characterization information can be extracted from the power data. The user event characterization information can indicate consumer devices that are being used or not being used (i.e., user events) at the service area based on the power data. In step 206, current behavior at the service area, as indicated from the power data, can be stored in a data store.

In step 208, one or more historical behavior models for the service area can be built over a defined period, such as a week, a month, etc. The historical behavior models can include patterns and tendencies in behavior, with respect to power usage, for the service area over the defined period. The historical behavior models can be associated with a typical weekday, weekend, holiday, etc. In addition, the historical behavior models can be continually updated based on the real-time acquisition of power data. In step 210, the historical behavior models can be stored in a data store.

In step 214, the current behavior can be compared with the historical behavior models. In step 216, a deviation can be detected between the current behavior and the historical behavior models. The deviation can be outside of a possible variation (i.e., outside of a predefined threshold). In step 216, automated dialog can occur with a user at the service area in response to detecting the deviation. In step 212, the user can indicate that the current behavior at the service area is acceptable. In one example, the user can indicate that the current behavior is related to a special event, such as the user being on vacation or having a house guest. Therefore, the current behavior can be incorporated into the historical behavior models. In step 220, the user can send an incoherent response, no response, or a request for assistance. In step 222, a service can be performed, such as a caregiver or a first response being notified in order to assist the user.

Figure 3A:
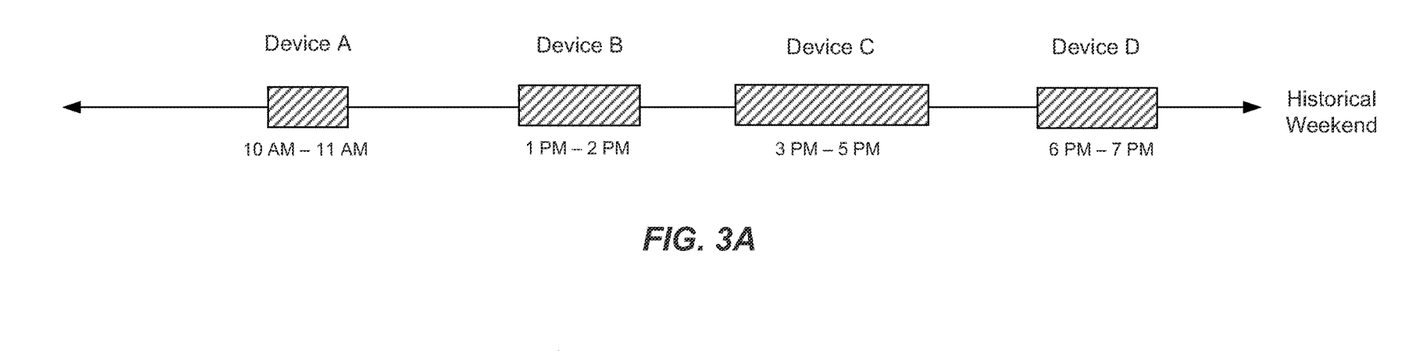
FIGS. 3A and 3B illustrate power consumption behavioral models in accordance with an example.
Figure 3B:
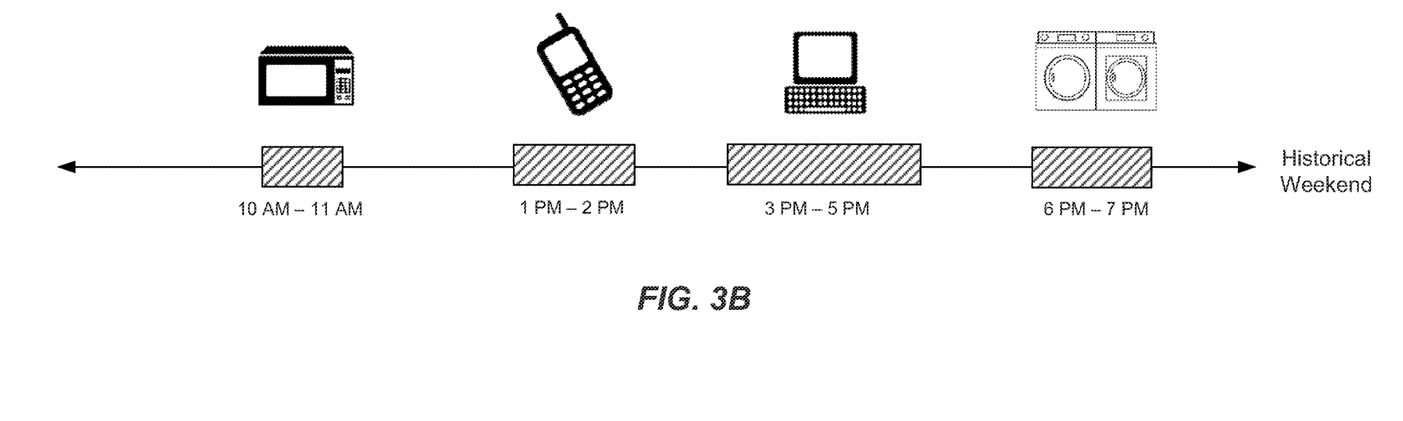

FIGS. 3A and 3B are examples of power consumption behavioral models for a weekend. The power consumption behavior models can indicate historical power consumption behaviors that occur during the weekend. As shown in FIG. 3A, the power consumption behavioral model can indicate that, within a service area, Device A is generally used (e.g., turned on or off) between 10 AM and 11 AM, Device B is generally used between 1 PM and 2 AM, Device C is generally used between 3 PM and 5 PM, and Device D is generally used between 6 PM and 7 PM. In one example, the devices can be detected as being used in the service area based on start-up/shutdown sequences associated with the devices. As shown in FIG. 3B, a specific device type can be associated with Devices A, B, C and D. For example, Device A can be a microwave, Device B can be a cordless phone, Device C can be a desktop computer, and Device D can be a washer dryer. In one configuration, the specific device type can be determined by comparing a power fingerprint associated with each device with a database containing a plurality of power fingerprints.

Figure 4:
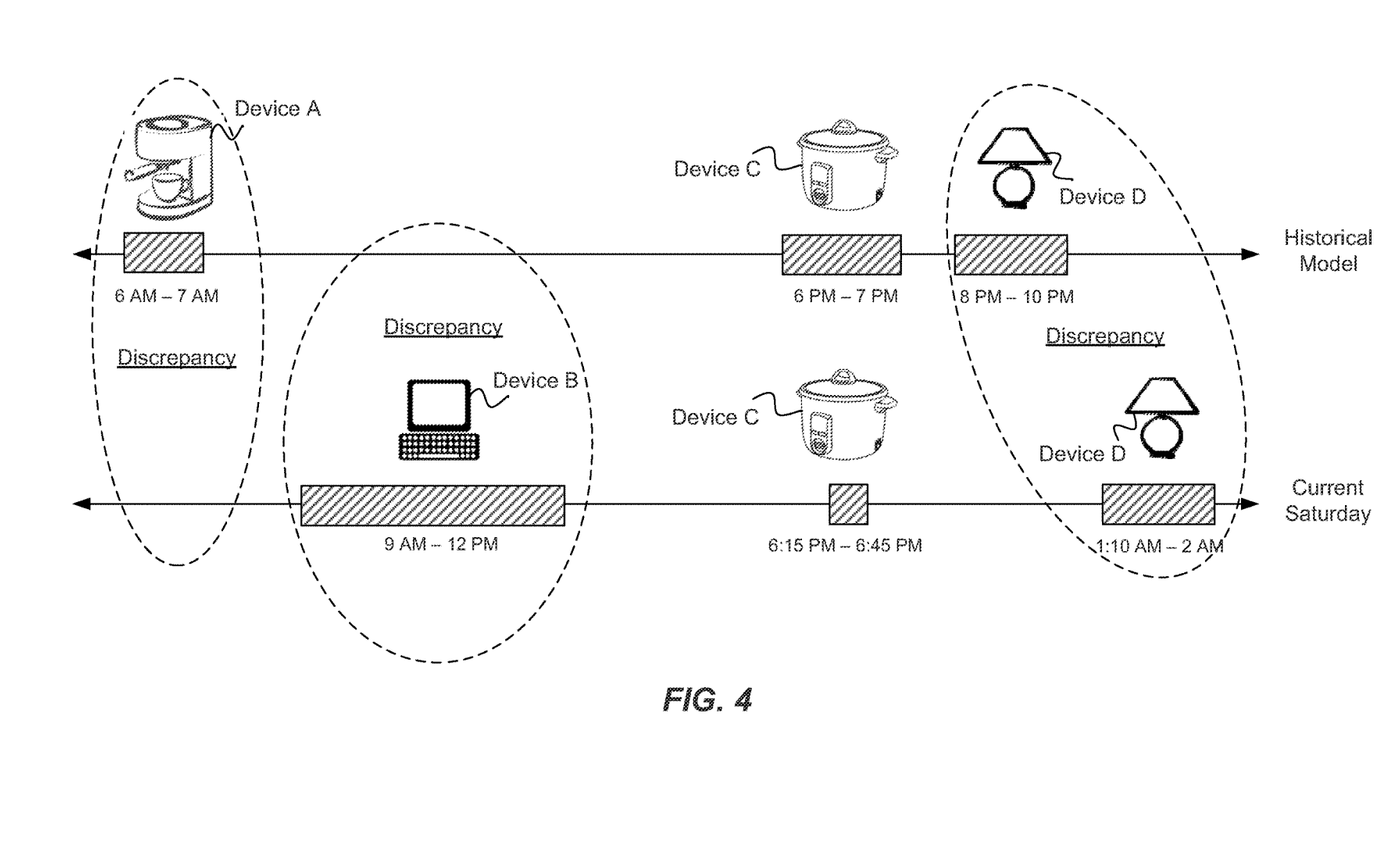
FIG. 4 illustrates a comparison of historical power consumption behavior with current power consumption behavior in accordance with an example.

FIG. 4 illustrates a comparison of historical power consumption behavioral with current power consumption behavior. According to historical power usage for Saturdays, Device A (e.g., a coffee maker) is generally used between 6 AM and 7 AM, Device C (e.g., a rice cooker) is generally used between 6 PM and 7 PM, and Device D (e.g., a table lamp) is generally used between 8 PM and 10 PM. On the current Saturday, Device A is not used, which is in contrast to the historical power usage for Saturdays. Device B (e.g., a desktop computer) is used from 9 AM to 12 PM, but the historical power usage indicates that the desktop computer is not generally used on Saturdays. Device C is used on the current Saturday during a time frame that corresponds to the historical power usage for Saturdays. In addition, Device D is used on the current Saturday approximately three hours past when Device D is typically used on Saturdays. The comparison between the historical power consumption behavior and the current power consumption behavior, and resulting discrepancies, can be used to generate alerts and/or update power consumption behavioral models.

Figure 5:
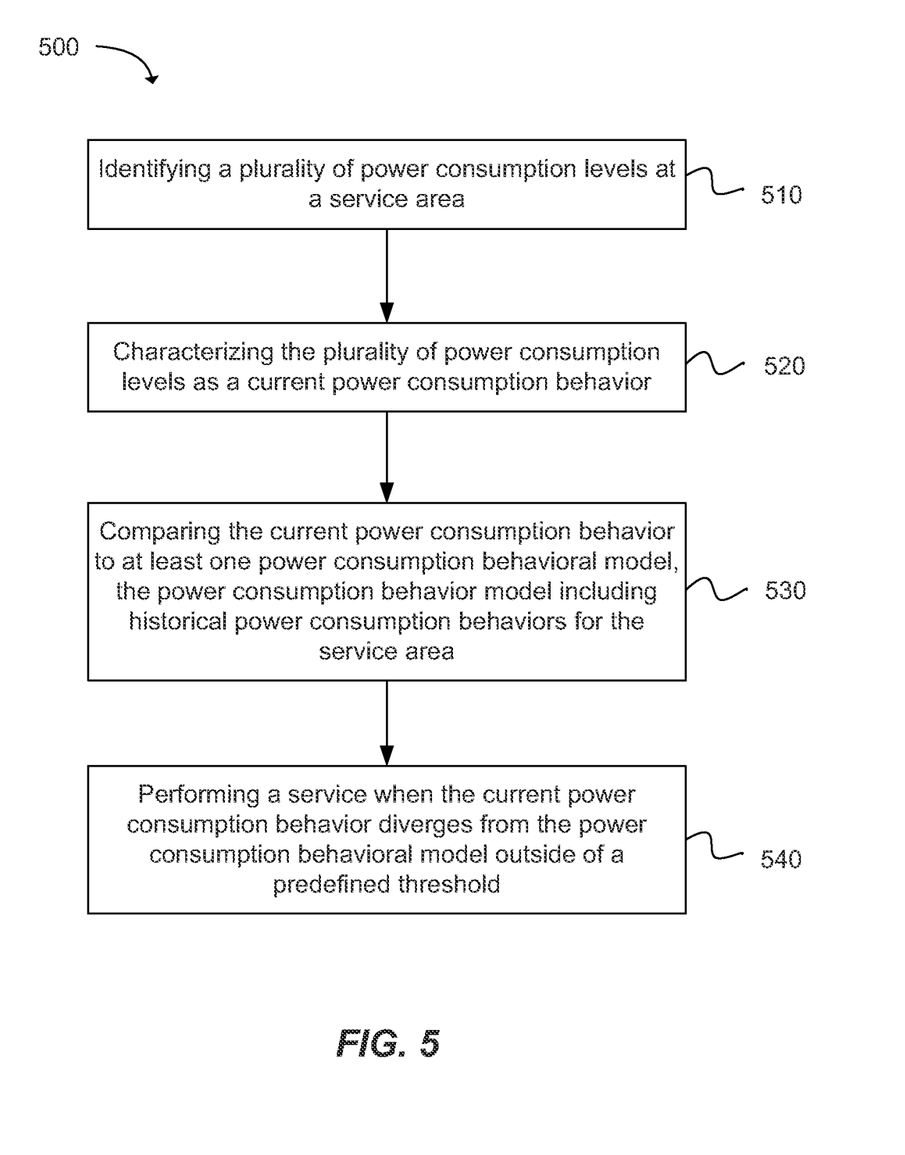
FIG. 5 depicts a flow chart of a method for performing services based on power consumption in accordance with an example.

FIG. 5 depicts a flow chart of a method 600 for performing services based on power consumption. The method can be executed as instructions on a machine, where the instructions are included on at least one computer readable medium or one non-transitory machine readable storage medium. The method can include the operation of identifying a plurality of power consumption levels at a service area for a defined time period, as in block 510. The method can include the operation of characterizing the plurality of power consumption levels as a current power consumption behavior, as in block 520. The method can include the operation of comparing the current power consumption behavior to at least one power consumption behavioral model, the power consumption behavior model including historical power consumption behaviors for the service area, as in block 530. The method can include the operation of performing a service when the current power consumption behavior diverges from the power consumption behavioral model outside of a predefined threshold, as in block 540.

In one configuration, the method can include the operation of detecting the plurality of power consumption levels for the service area according to a predefined sample rate. In addition, the method can include the operation of detecting the plurality of power consumption levels for the service area using a power meter. In one aspect, the power consumption levels can include voltage levels, amperage levels and phase information at the service area.

In one example, performing the service can include alerting an emergency responder when the current power consumption behavior diverges from the power consumption behavioral model outside of the predefined threshold. In yet another example, performing the service can include alerting a caregiver when the current power consumption behavior diverges from the power consumption behavioral model outside of the predefined threshold.

In one aspect, the current power consumption behavior can indicate one or more devices that are being used or not being used at the service area. In one configuration, the method can include the operations of communicating a status request message to a user associated with the service area when the current power consumption behavior diverges from the power consumption behavioral model outside of the predefined threshold; and alerting an emergency responder when a response to the status request message is not received from the user within a predefined time window.

In one configuration, the method can include the operations of communicating a status request message to a user associated with the service area when the current power consumption behavior diverges from the power consumption behavioral model outside of the predefined threshold; receiving a response to the status request message from the user indicating that the current power consumption behavior is acceptable to the user; and updating the power consumption behavioral model to incorporate the current power consumption behavior. In one aspect, the method can include the operation of providing a notification with positive reinforcement when the current power consumption behavior corresponds with the power consumption behavioral model. In another aspect, the method can include the operation of providing a notification with suggested actions when the current power consumption behavior does not correspond with the power consumption behavioral model.

Figure 6:
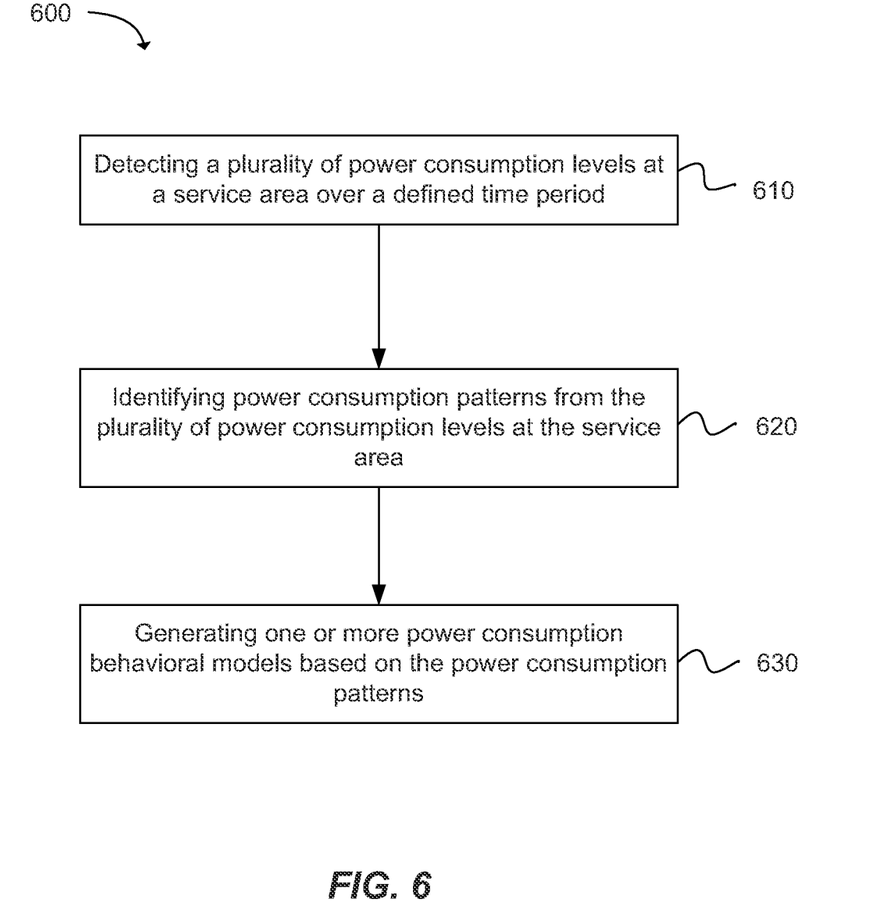
FIG. 6 depicts a flow chart of an additional method for performing services based on power consumption in accordance with an example.

FIG. 6 depicts a flow chart of a method 600 for generating power consumption behavioral models. The method can be executed as instructions on a machine, where the instructions are included on at least one computer readable medium or one non-transitory machine readable storage medium. The method can include the operation of detecting a plurality of power consumption levels at a service area over a defined time period, as in block 610. The method can include the operation of identifying power consumption patterns from the plurality of power consumption levels at the service area, as in block 620. The method can include the operation of generating one or more power consumption behavioral models based on the power consumption patterns, as in block 630.

In one configuration, the method can include the operation of detecting the plurality of power consumption levels at the service area according to a predefined sample rate. In one aspect, the power consumption behavioral models can indicate patterns of use for one or more devices and patterns of non-use for one or more devices. In addition, the method can include the operation of detecting the plurality of power consumption levels at the service area using a power meter.

In one example, the method can include the operation of updating the power consumption behavioral models based on current power consumption behavior at the service area. In one aspect, the power consumption behavioral models for the service area can be associated with at least one of: a holiday, a weekday, a weekend or a vacation day. In yet another aspect, emergency medical personnel can be notified when current power consumption behavior diverges from the power consumption behavioral models beyond a predefined threshold.

Figure 7:
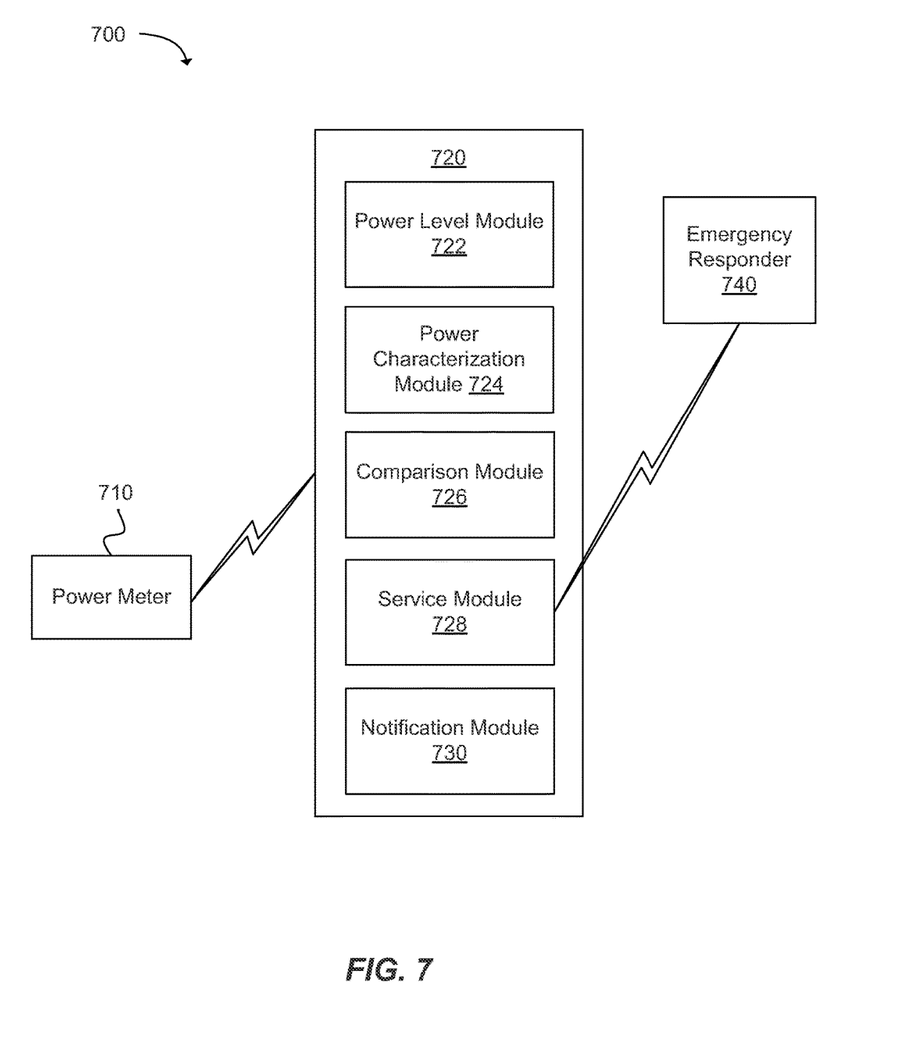
FIG. 7 is a system for performing services based on power consumption in accordance with an example.

FIG. 7 depicts a system 700 for performing services based on power consumption. The system 700 can include a processing element 720. The processing element 720 can include a processor and a memory device including a data store to store a plurality of data and instructions that, when executed by the processor, cause the processor to execute: a power level module 722, a power characterization module 724, a comparison module 726, a service module 728 and a notification module 730.

The power level module 722 can be configured to identify a plurality of power consumption levels at a service area for a defined time period. The power characterization module 724 can be configured to characterize the plurality of power consumption levels as a current power consumption behavior. The comparison module 726 can be configured to compare the current power consumption behavior to at least one power consumption behavioral model, the power consumption behavioral model including historical power consumption behaviors for the service area. The service module 728 can be configured to perform a service when the current power consumption behavior varies from the power consumption behavioral model outside of a predefined threshold. The notification module 728 can be configured to provide a notification with positive reinforcement when the current power consumption behavior corresponds to the power consumption behavioral model; or provide a notification with suggested actions when the current power consumption behavior does not correspond to the power consumption behavioral model.

The system 700 can include a power meter 710 configured to detect the plurality of power consumption levels for the service area according to a predefined sample rate. In one example, the power meter 710 can be integrated with the processing element 720. In addition, the service module 726 can be further configured to alert an emergency responder 740 when the current power consumption behavior varies from the power consumption behavioral model outside of the predefined threshold.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The satellite may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function.

Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for performing services based on power consumption, the method comprising:
   under control of one or more computer systems configured with executable instructions:
   identifying a plurality of power consumption levels at a service area;
   characterizing the plurality of power consumption levels as a current power consumption behavior;
   comparing the current power consumption behavior to at least one power consumption behavioral model, the power consumption behavior model including historical power consumption behaviors for the service area;
   determining if the current power consumption behavior diverges from the power consumption behavioral model outside of a predefined threshold;
   performing a human health monitoring service pertaining to a user at the service area when the current power consumption behavior varies from the power consumption behavioral model outside of the predefined threshold, wherein emergency medical personnel are notified upon a non-response from the user to a status request message by the human health monitoring service after a predefined time; and
   providing a notification to the user and a caregiver upon detecting desirable user habits if the current power consumption behavior corresponds with the power consumption behavioral model.

2. The method of claim 1, further comprising detecting the plurality of power consumption levels for the service area according to a predefined sample rate.

3. The method of claim 1, further comprising detecting the plurality of power consumption levels for the service area using a power meter.

4. The method of claim 1, wherein the power consumption levels include voltage levels, amperage levels and phase information at the service area.

5. The method of claim 1, wherein the predefined time is at least 30 minutes.

6. The method of claim 1, wherein the current power consumption behavior indicates one or more devices that are being used or not being used at the service area.

7. The method of claim 1, wherein performing the human health monitoring service further comprises communicating the status request message to the user associated with the service area when the current power consumption behavior diverges from the power consumption behavioral model outside of the predefined threshold.

8. The method of claim 1, further comprising:
   communicating the status request message to the user associated with the service area when the current power consumption behavior diverges from the power consumption behavioral model outside of the predefined threshold;
   receiving a response to the status request message from the user indicating that the current power consumption behavior is acceptable to the user; and
   updating the power consumption behavioral model to incorporate the current power consumption behavior.

9. The method of claim 1, further comprising providing a notification with positive reinforcement when the current power consumption behavior corresponds with the power consumption behavioral model.

10. The method of claim 1, further comprising providing a notification with suggested actions when the current power consumption behavior does not correspond with the power consumption behavioral model.

11. A method for generating power consumption behavioral models, the method comprising:
    under control of one or more computer systems configured with executable instructions:
    detecting a plurality of power consumption levels at a service area over a defined time period;
    identifying power consumption patterns from the plurality of power consumption levels at the service area;
    generating one or more power consumption behavioral models based on the power consumption patterns;
    performing a human health monitoring service pertaining to a user at the service area when a current power consumption behavior varies from the one or more power consumption behavioral models outside of a predefined threshold, wherein emergency medical personnel are notified upon a non-response from the user to a status request message by the human health monitoring service after a predefined time; and
    providing a notification to the user and a caregiver upon detecting desirable user habits if the current power consumption behavior corresponds with the one or more power consumption behavioral models.

12. The method of claim 11, further comprising detecting the plurality of power consumption levels at the service area according to a predefined sample rate.

13. The method of claim 11, wherein the power consumption behavioral models indicate patterns of use for one or more devices and patterns of non-use for one or more devices.

14. The method of claim 11, further comprising detecting the plurality of power consumption levels at the service area using a power meter.

15. The method of claim 11, further comprising updating the power consumption behavioral models based on current power consumption behavior at the service area.

16. The method of claim 11, wherein the power consumption behavioral models for the service area are associated with at least one of: a holiday, a weekday, a weekend or a vacation day.

17. A system for performing services based on power consumption, the system comprising:
   a processor;
   a memory device including a data store to store a plurality of data and instructions that, when executed by the processor, cause the processor to execute:
   a power level module configured to identify a plurality of power consumption levels at a service area;
   a power characterization module configured to characterize one or more of the plurality of power consumption levels as a current power consumption behavior;
   a comparison module configured to compare the current power consumption behavior to at least one power consumption behavioral model, the at least one power consumption behavioral model including one or more historical power consumption behaviors for the service area; and
   a service module configured to perform a human health monitoring service pertaining to a user at the service area when the current power consumption behavior varies from the at least one power consumption behavioral model outside of a predefined threshold, wherein the service module notifies emergency medical personnel upon a non-response from the user to a status request after a predefined time, and wherein the service module provides a notification to the user and a caregiver upon detecting desirable user habits if the current power consumption behavior corresponds with the at least one power consumption behavioral model.

18. The system of claim 17, further comprising a power meter configured to detect the plurality of power consumption levels for the service area according to a predefined sample rate.

19. The system of claim 17, further comprising a notification module configured to:
   provide a notification with positive reinforcement when the current power consumption behavior corresponds to the power consumption behavioral model; or
   provide a notification with suggested actions when the current power consumption behavior does not correspond to the power consumption behavioral model.

* * * * *